(12) United States Patent
Viton

(10) Patent No.: US 6,184,591 B1
(45) Date of Patent: Feb. 6, 2001

(54) AUXILIARY APPARATUS FOR CONTROLLING AT LEAST ONE ELECTRICALLY OPERATED FUNCTIONALLY DEVICE

(75) Inventor: Michel Viton, Seyssinet (FR)

(73) Assignee: L'air Liquide, Societe Anonyme pour l'Etude et l'Exploitation des Procedex Georges Claude, Paris (FR)

( * ) Notice: Under 35 U.S.C. 154(b), the term of this patent shall be extended for 0 days.

(21) Appl. No.: 09/256,298

(22) Filed: Feb. 24, 1999

(30) Foreign Application Priority Data

Feb. 26, 1998 (FR) .................................................. 98 02329

(51) Int. Cl.[7] ...................................................... H02J 1/10
(52) U.S. Cl. ................................. 307/29; 307/38; 307/326
(58) Field of Search ................................ 307/29, 38–41, 307/134, 139, 140, 326, 328; 361/189

(56) References Cited

U.S. PATENT DOCUMENTS 3,746,938 * 7/1973 Lamb ..................................... 317/136
4,704,599 * 11/1987 Kimmel et al. ...................... 307/149
4,890,001 * 12/1989 Eickelmann ............................ 307/38

FOREIGN PATENT DOCUMENTS

| 24 47 123 | 4/1976 | (DE) . |
|---|---|---|
| 25 12 207 | 10/1976 | (DE) . |
| 0 099 807 | 2/1984 | (EP) . |
| 0 495 388 | 7/1992 | (EP) . |
| 11-115615 | * 4/1999 | (JP) . |

\* cited by examiner

*Primary Examiner*—Fritz Fleming
(74) *Attorney, Agent, or Firm*—Burns, Doane, Swecker & Mathis, L.L.P.

(57) ABSTRACT

The invention relates to an auxiliary apparatus for controlling at least one electrically operated functional device (3), which is designed to replace a main unit (5) for controlling the said at least one functional device (3), and which can be plugged into terminals (7, 9, 11) for connecting the latter that are provided for this purpose. The said apparatus (1) comprises, for each functional device (3), a manually operated switch (12) interposed between a line (14) for delivering an electric control potential, this line being intended to be connected to an associated supply terminal (9), and an associated line (16) for transmitting the electric control potential to the said at least one functional device (3). It furthermore comprises, for each switch (12), an associated device (18) for controlling safety means (20) for taking the said electric control potential to the said at least one switch (12), the actuation of the said safety means (20) being caused by the first open state of the said at least one switch (12).

18 Claims, 1 Drawing Sheet

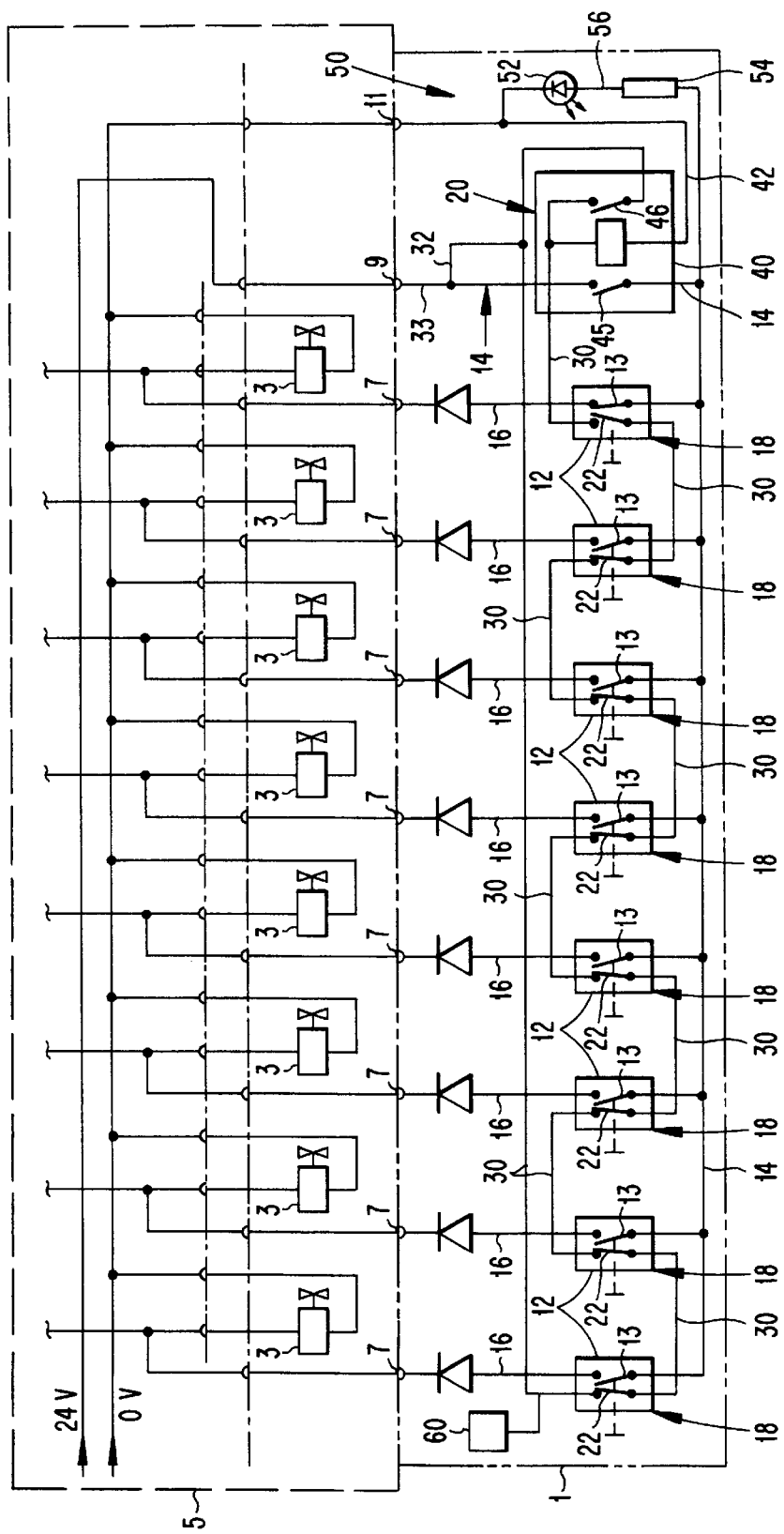

AUXILIARY APPARATUS FOR CONTROLLING AT LEAST ONE ELECTRICALLY OPERATED FUNCTIONALLY DEVICE

This application claims priority under 35 U.S.C. §§119 and/or 365 to 98 02329 filed in France on Feb. 26, 1998; the entire content of which is hereby incorporated by reference.

BACKGROUND OF THE INVENTION

1. Field of the Invention

The invention relates to an auxiliary apparatus for controlling electrically operated functional devices, such as solenoid valves, designed to replace a main control unit such as, for example, an automatic controller, should it fail, and more particularly to an auxiliary apparatus for controlling valves of a gas delivery facility also known as a gas cabinet.

2. Description of the Related Art

The fabrication of microelectronic circuits requires the use of various gases called "working" gases such as, for example $Cl_2$, $NH_3$, HCl, HBr, $NF_3$, $WF_6$, etc., which gases are for the most part regarded as being dangerous to humans because of their toxicity and/or their inflammability.

These gases are taken to stations where they are used, such as stations for the fabrication of microelectronic circuits, via a gas cabinet.

Because of the toxicity of the gases employed, the safe control of the operation of such a supply cabinet is an absolute priority. This is why such cabinets are generally equipped with an automatic controller for controlling and operating the various valves placed in the cabinet.

For economic reasons, it is necessary, should the automatic controller fail, to be able to continue to operate the valves.

For this purpose, an auxiliary apparatus for controlling solenoid valves, which is designed to replace the automatic controller and be plugged into the latter's connection terminals that are provided for this purpose, is known.

This apparatus comprises, for each solenoid valve, a manually operated switch interposed between a line for delivering an electric control potential, this line being intended to be connected to an associated supply terminal of the automatic controller, and an associated line for transmitting the electric control potential to a predetermined solenoid valve.

This apparatus has the drawback that the operator may inadvertently set one or more switches in a closed position when connecting the apparatus to the automatic controller so that the valves associated with these switches open adventitiously, which in turn may cause considerable damage to equipment or even to personnel.

SUMMARY OF THE INVENTION

The invention aims to alleviate this drawback by proposing a more reliable auxiliary control apparatus.

For this purpose, the subject of the invention is an auxiliary apparatus for controlling at least one electrically operated functional device, which is designed to replace a main unit for controlling the said at least one functional device, for example should this main unit fail, and which can be plugged into terminals for connecting the latter that are provided for this purpose, the said apparatus comprising, for each functional device, a manually operated switch interposed between a line for delivering an electric control potential, this line being intended to be connected to an associated supply terminal, and an associated line for transmitting the electric control potential to the said at least one functional device, characterized in that it furthermore comprises, for each switch, an associated device for controlling safety means for taking the said electric control potential to the said at least one switch, the actuation of the said safety means being caused by the first open state of the said at least one switch.

The apparatus according to the invention may additionally include one or more of the following characteristics:

- the associated device for controlling the said safety means comprises a moving actuation contact carried by the switch with which it is associated, placed in a line for actuating the said safety means and coupled to a moving contact of the said switch, allowing the control potential to be transmitted to the said at least one functional device;
- the said safety means include a self-latching relay actuated when it receives a supply potential via the said actuation line in order to deliver, in its active position, the electric control potential to the said at least one switch;
- the said actuation line is connected, upstream of the self-latching relay, to the line for delivering the control potential in order to deliver the said supply potential to the self-latching relay when the said at least one switch is in the first open state;
- the said actuation line is connected to an electrical battery carried by the apparatus in order to deliver the said supply potential to the self-latching relay when the said at least one switch is in the first open state;
- it comprises several switches for several functional devices and the actuation of the said safety means is caused by the first open state of all of the switches;
- the said second moving contacts are placed in series in the said actuation line so that the safety means are actuated when each switch is in its first open state;
- it includes means for indicating the state of actuation of the said safety means.

BRIEF DESCRIPTION OF THE FIGURE OF THE DRAWING

Further characteristics and advantages of the invention will emerge from the following description, given by way of example but without any limiting character, with regard to the appended drawing which shows an electrical circuit diagram of the apparatus according to the invention.

Shown in the single FIGURE is an auxiliary apparatus 1 for controlling at least one and preferably several electrically operated functional devices 3 such as, for example, solenoid valves of a gas cabinet.

DETAILED DESCRIPTION OF THE PREFERRED EMBODIMENT

This auxiliary apparatus 1 is designed to replace a main unit 5 for controlling the solenoid valves 3, such as an automatic controller, for example should this unit fail, and can be plugged into terminals 7, 9 and 11 of this unit 5 that are provided for this purpose.

The auxiliary apparatus 1 comprises, for each solenoid valve 3, an associated manually operated switch 12. Each switch 12 comprises a first moving contact 13, allowing the control potential to be transmitted to a predetermined functional device 3 in the closed position of the switch 12 and to stop this control potential being transmitted in the open position of the switch 12.

For this purpose, each switch 12 is interposed between, on the one hand, a line 14 for delivering an electric control potential, this line being intended to be connected to an associated supply terminal of the unit 5, namely the connection terminal 9, and, on the other hand, an associated line 16 for transmitting the electric control potential to a predetermined solenoid valve 3, this line being intended to be connected to an associated output terminal, namely a connection terminal 7.

In order for the apparatus 1 to be unable to operate a solenoid valve 3 adventitiously when connecting it to the terminals 7, 9 and 11 of the unit 5, the apparatus 1 comprises, for each switch 12, an associated device 18 for controlling safety means 20 for taking the said electric control potential to each switch 12.

Each device 18 is advantageously formed by a second moving contact 22 carried by the switch 12 with which it is associated, and coupled to the moving contact 13 for transmitting the control potential in such a way that it is in the closed position when the moving contact 13 is in the open position and in the open position when the latter is in the closed position. This second moving contact 22 is called hereafter the "moving actuation contact".

As may be seen in the FIGURE, the moving actuation contacts 22 are placed in series in a line 30 for actuating the safety means 20. This actuation line 30 is supplied with the electric control potential for the solenoid valves via a branch 32 connected to a portion 33 of the delivery line 14 which is always at the electric control potential after the apparatus 1 has been connected to the terminals 7, 9 and 11.

Thus, after the apparatus 1 has been connected to the terminals 7, 9 and 11, the electric control potential is conveyed to the safety means 20 only after all of the switches 12 are in the open position and, consequently, all the moving actuation contacts 22 are in the closed position.

The safety means 20 comprise a self-latching relay 40 placed downstream of the portion 33 in the delivery line 14. This relay 40 is actuated when it receives a supply potential such as, for example, the electric control potential, via the said actuation line 30. In the active position of the relay 40, delivery of the electric control potential to each switch 12 is ensured by its contact 45 being in the closed position, its contact 46, the input side of which is connected to the portion 33 which is always at the electric control potential, keeping, because of its closed position, the relay 40 supplied even if one of the switches 12 is subsequently switched into a closed position and the relay 40 stops being supplied via the actuation line 30. In the inactive position of the relay 40, the contact 45 is in the open position and stops delivery of the control potential to the switches 12.

Of course, the actuation line 30, and thus the relay 40, may also be supplied by a voltage supply independent of the main unit 5, such as, for example, an electrical battery 60 carried by the apparatus 1.

Moreover, the relay 40 is connected via the line 42 to the terminal 11 delivering a zero-volt potential.

Furthermore, the apparatus 1 comprises means 50 for indicating the state of actuation of the safety means 20. These indicating means 50 are formed by a light-emitting diode 52 and a resistor 54 which are placed in series in a branch 56 connected, on the one hand, to the zero-volt potential and, on the other hand, downstream of the relay 40, to the line 14 for delivering the electric control potential to each switch 12.

The auxiliary control apparatus 1 operates in the following manner.

Firstly, it is assumed that one of the switches 12, for example the one placed just beside the safety means 20, is in the closed position when the apparatus 1 is being connected to the main unit 5.

Since the apparatus 1 is not supplied at the start, the contacts 45 and 46 of the relay 40 are in the open position and the control potential cannot reach the relay 40 via the actuation line 30, given that this line 30 is cut by the moving contact 22 of the switch placed just beside the safety means 20, this switch being in the closed position. Consequently, none of the switches 12 is supplied with the control potential and an operator is prevented from inadvertently operating the solenoid valves 3.

The relay 40 is actuated only when it is electrically supplied. To do this, this switch 12 must be manually switched into a first open state so that the control potential can reach the relay 40 and close the contacts 45 and 46 of the latter. For a switch, the "first open state" means the first time that this switch 12 is in the open position after connection to the main unit 5, without any distinction as to whether this switch was in this state while the apparatus was being connected or whether it was subsequently put into this position by an operator.

Once the relay 40 is supplied, the control potential is delivered to each switch 12 via the line 14. Given that the relay 40 is a self-latching relay, it remains supplied because of the closed position of its contact 46, even if one of the switches 12 is later switched into a closed position.

The state of actuation of the relay 40 is indicated to the operator by the means 50, i.e. by the light emitted by the diode 52.

Of course, if several switches 12 had been in a closed position at the time of connection, it would have been necessary to switch each switch 12 into a first open state in order to close the circuit for supplying the relay 40, comprising the actuation line 30 on the one hand and the line 42 on the other hand.

These explanations show that this auxiliary control apparatus 1 of the invention provides greater safety for the operator since the switches 12 are supplied with the control potential for the solenoid valves 3 only when each switch has been placed a first time in a first open state.

What is claimed is:

1. Auxiliary apparatus for controlling at least one electrically operated functional device, which is designed to bypass a main unit for controlling the at least one functional device, and which can be connected to the main unit by plugging into terminals provided for this purpose, the apparatus comprising, for each functional device, a manually operated switch interposed between a line for delivering an electric control potential, the line for delivering an electric control potential being connectable to an associated supply terminal, an associated line for transmitting the electric control potential to the at least one functional device, and an associated device for each said switch for controlling a safety means for taking the electric control potential to the at least one switch, the actuation of the safety means being caused by the first open state of the at least one switch.

2. Apparatus according to claim 1, wherein the associated device for controlling the safety means comprises a moving actuation contact carried by the switch with which the associated device is associated, placed in a line for actuating the safety means and coupled to a moving contact of the switch, allowing the control potential to be transmitted to the at least one functional device.

3. Apparatus according to claim 2, wherein the safety means comprises a self-latching relay actuated when said relay receives a supply potential via the actuation line in order to deliver, in said relay's active position, the electric control potential to the at least one switch.

4. Apparatus according to claim 3, wherein the actuation line is connected, upstream of the self-latching relay, to the line for delivering the control potential in order to deliver the supply potential to the self-latching relay when the at least one switch is in the first open state.

5. Apparatus according to claim 4, comprising a plurality of said switches and said functional devices, wherein the actuation of the safety means is caused by the first open state of all of the switches.

6. Apparatus according to claim 4, further comprising means for indicating the state of actuation of the safety means.

7. Apparatus according to claim 3, wherein the actuation line is connected to an electrical battery carried by the apparatus in order to deliver the supply potential to the self-latching relay when the at least one switch is in the first open state.

8. Apparatus according to claim 7, comprising a plurality of said switches and said functional devices, wherein the actuation of the safety means is caused by the first open state of all of the switches.

9. Apparatus according to claim 7, further comprising means for indicating the state of actuation of the safety means.

10. Apparatus according to claim 3, comprising a plurality of said switches and said functional devices, wherein the actuation of the safety means is caused by the first open state of all of the switches.

11. Apparatus according to claim 3, further comprising means for indicating the state of actuation of the safety means.

12. Apparatus according to claim 2, further comprising means for indicating the state of actuation of the safety means.

13. Apparatus according to claim 2, comprising a plurality of said switches and said functional devices, wherein the actuation of the safety means is caused by the first open state of all of the switches.

14. Apparatus according to claim 13, wherein the moving actuation contacts are placed in series in the actuation line so that the safety means are actuated when each switch is in its first open state.

15. Apparatus according to claim 14, wherein it includes means for indicating the state of actuation of the safety means.

16. Apparatus according to claim 1, wherein it comprises several switches for several functional devices and in that the actuation of the safety means is caused by the first open state of all of the switches.

17. Apparatus according to claim 16, wherein it includes means for indicating the state of actuation of the safety means.

18. Apparatus according to claim 1, wherein it includes means for indicating the state of actuation of the safety means.

* * * * *